J. H. BELL.
TELEGRAPH SYSTEM.
APPLICATION FILED APR. 17, 1918.

1,367,729.  Patented Feb. 8, 1921.
9 SHEETS—SHEET 9.

Inventor:
John H. Bell
by J. G. Roberts  Att'y.

UNITED STATES PATENT OFFICE.

JOHN H. BELL, OF SOUTH ORANGE, NEW JERSEY, ASSIGNOR TO WESTERN ELECTRIC COMPANY, INCORPORATED, OF NEW YORK, N. Y., A CORPORATION OF NEW YORK.

TELEGRAPH SYSTEM.

1,367,729.   Specification of Letters Patent.   Patented Feb. 8, 1921.

Application filed April 17, 1918. Serial No. 229,193.

*To all whom it may concern:*

Be it known that I, JOHN H. BELL, a citizen of the United States, residing at South Orange, in the county of Essex, State of New Jersey, have invented certain new and useful Improvements in Telegraph Systems, of which the following is a full, clear, concise, and exact description.

This invention relates to telegraph systems and more particularly to telegraph repeater systems.

The principal object of this invention is to provide an improved organization of apparatus to more readily meet service conditions in the handling of telegraphic traffic.

In order that the divers operations, such as balancing the duplexed circuits, changing of interconnections between the channels of different telegraphic circuits, synchronizing of multiplex distributers at a plurality of stations, observing or checking service on different telegraphic channels, etc., may be effectively carried on with facility at a telegraph repeater station, the present invention contemplates the employment of impulse receiving devices, connectively flexible groups of impulse storing devices, current distributer means and pluralities of switching devices coördinated in a manner to render service of this character in connection with a system of recording or printing telegraphs.

This invention is illustrated diagrammatically in the accompanying drawings, and in order that it may be more readily understood only such portions of a telegraphic equipment have been shown as will be necessary to a clear understanding of the features of this system.

Figure 1:
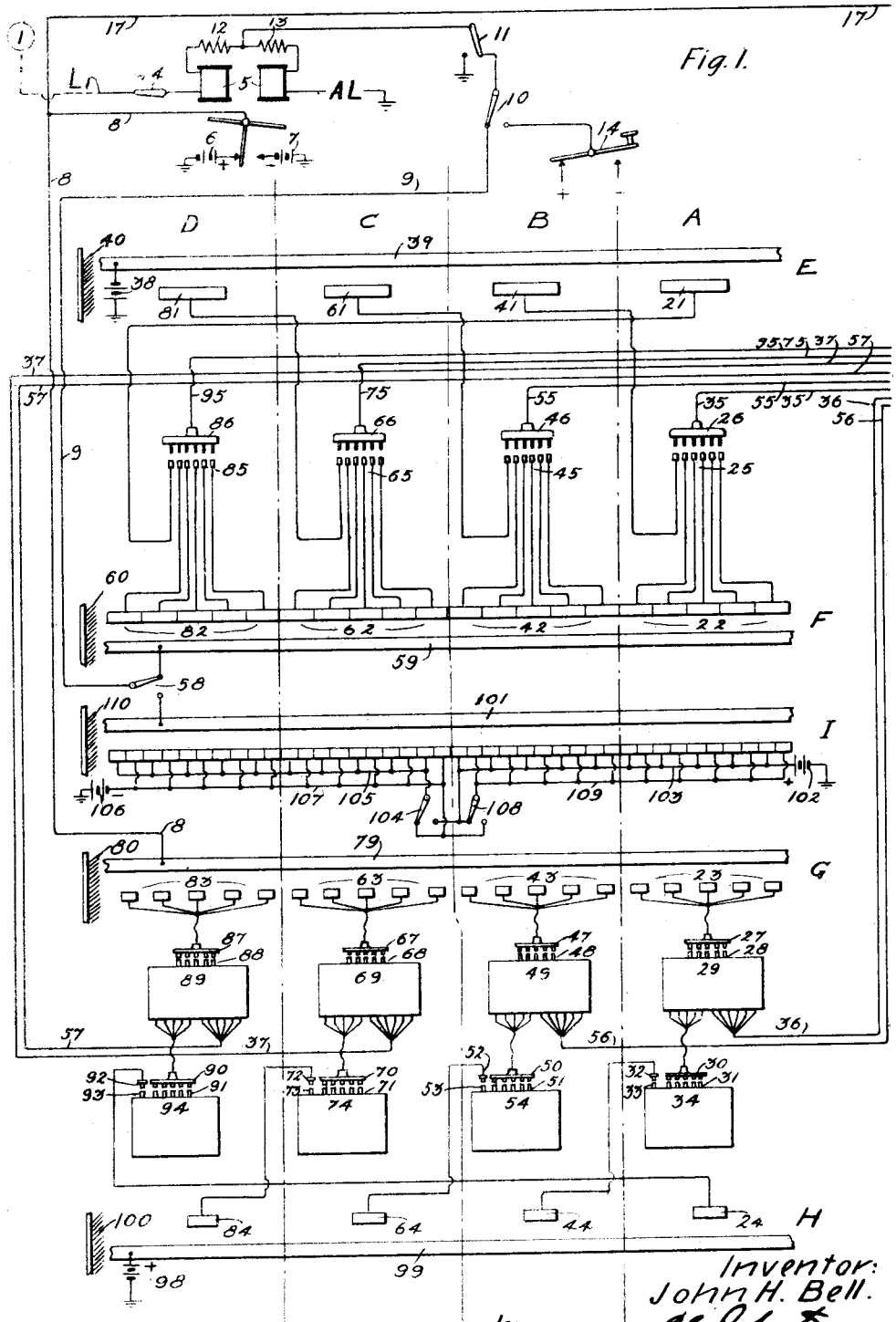
Figure 2:
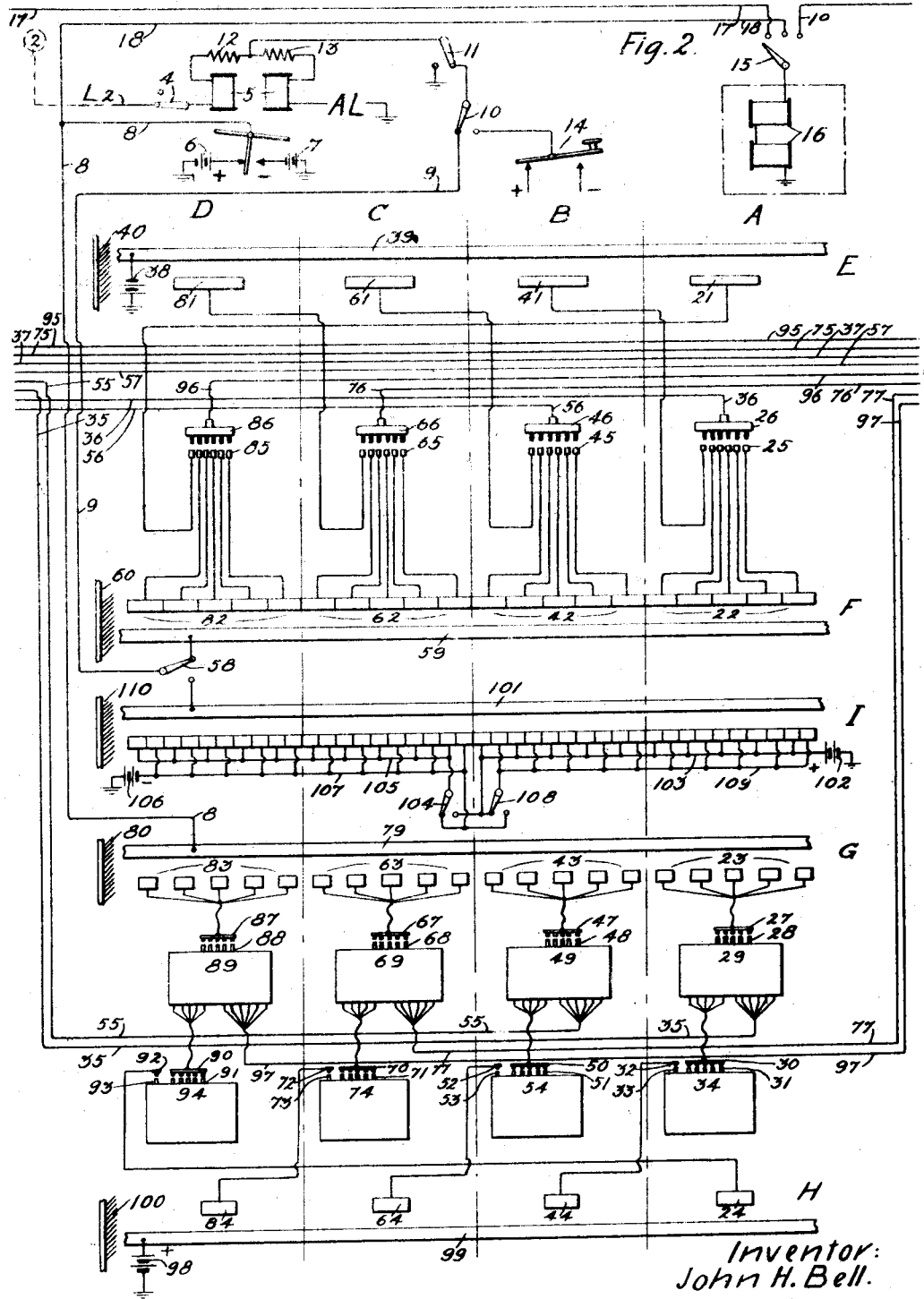
Figure 3:
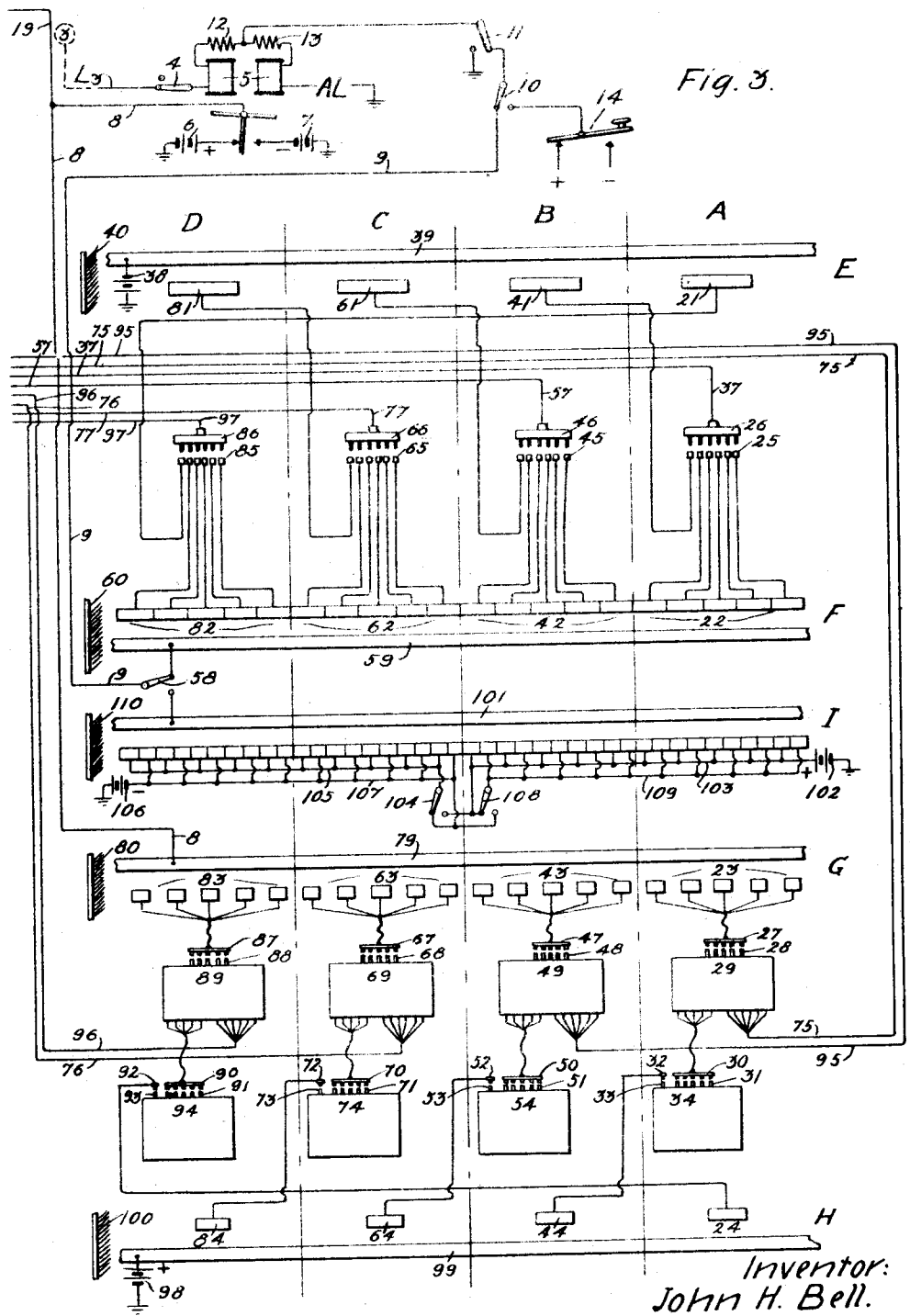
Figure 4:
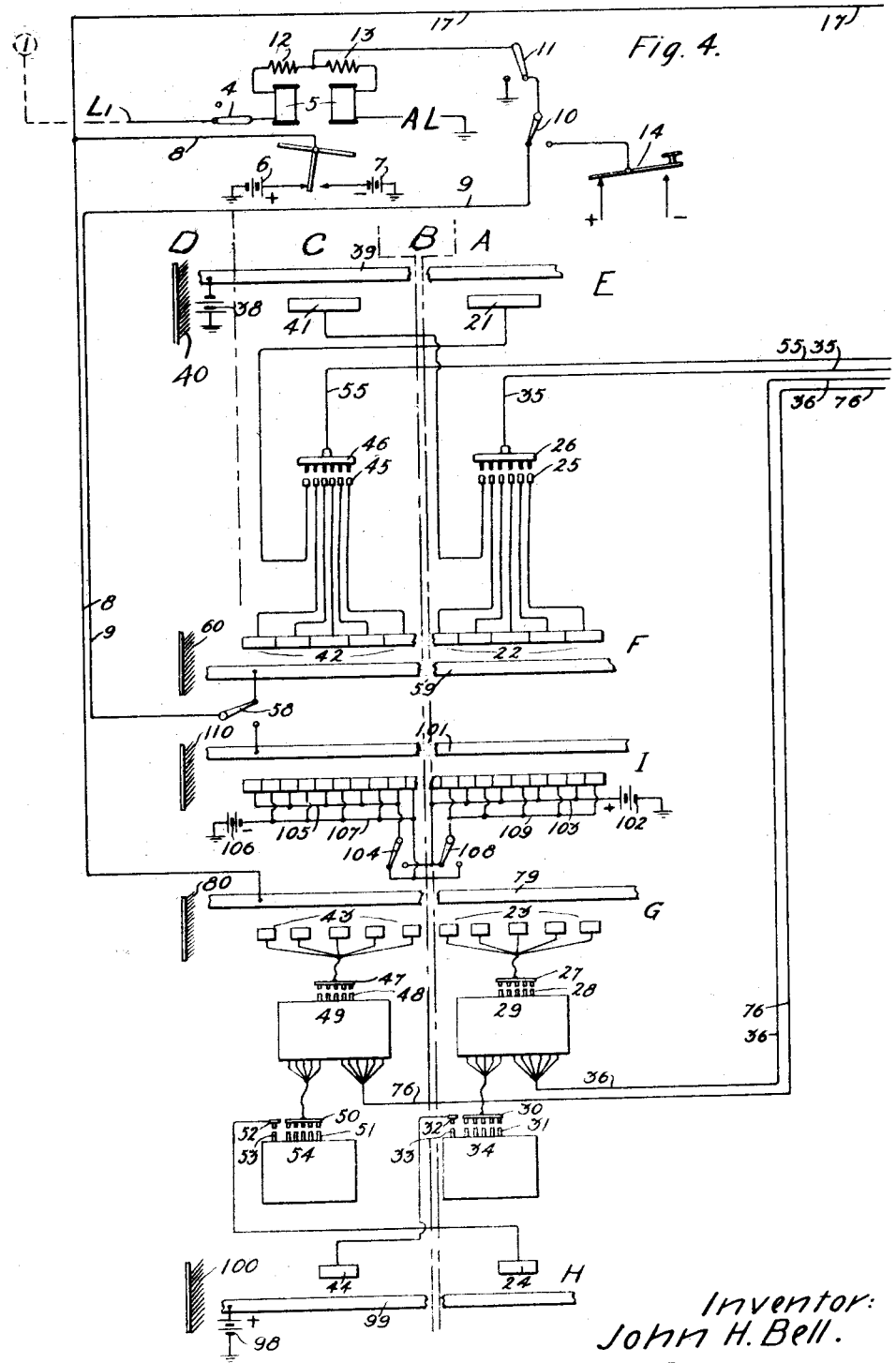
Figure 5:
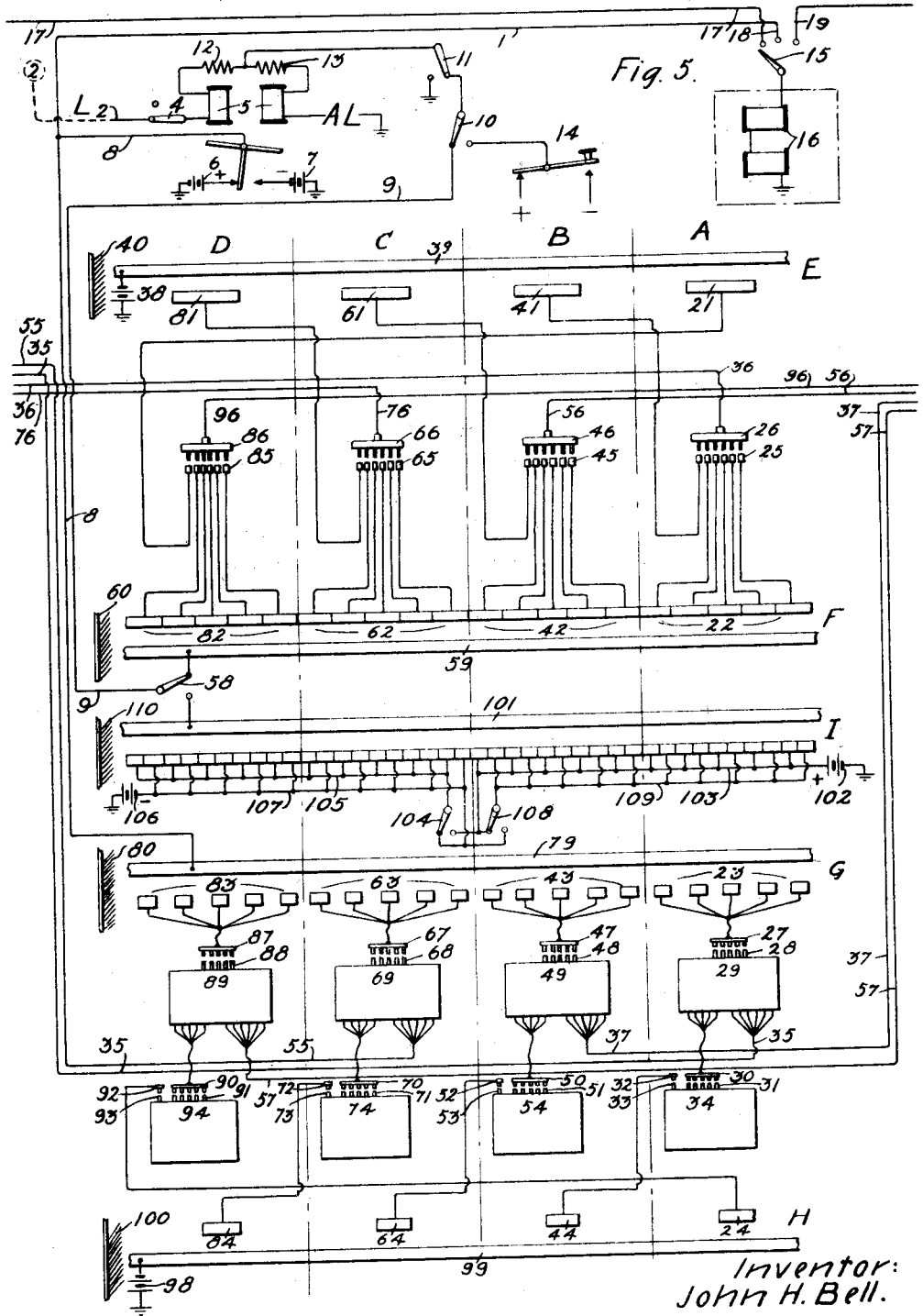
Figure 6:
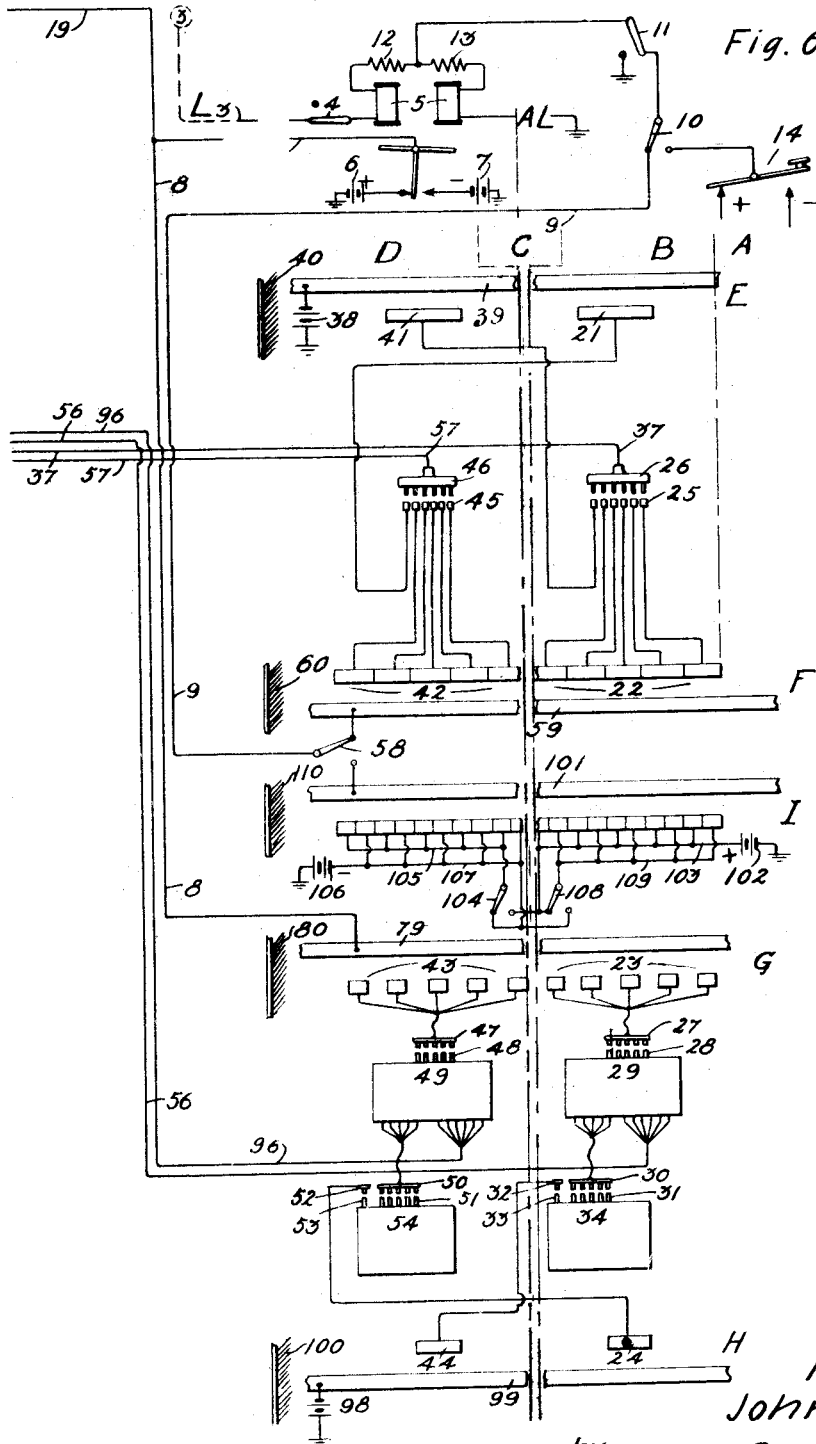
Figure 7:
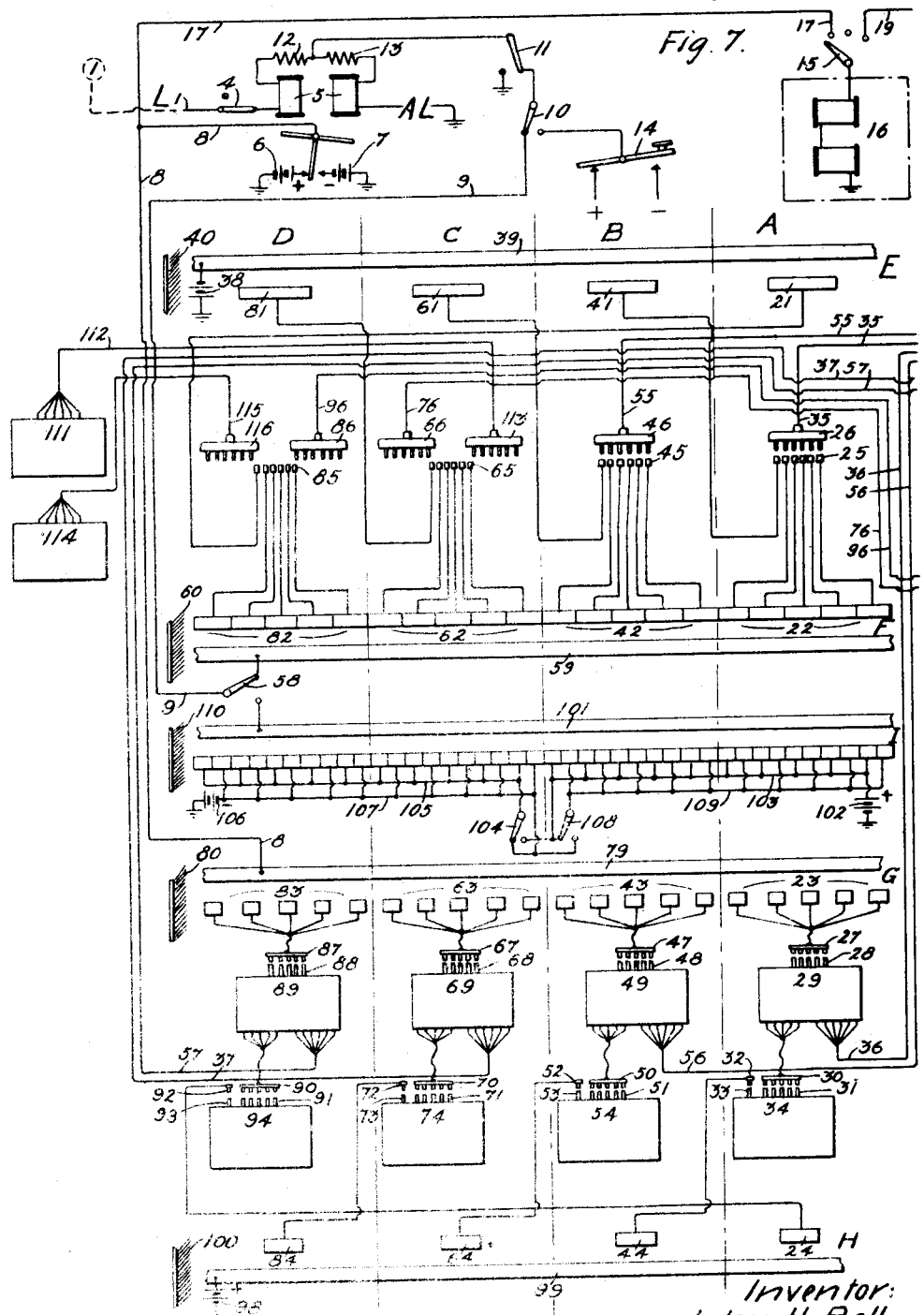
Figure 8:
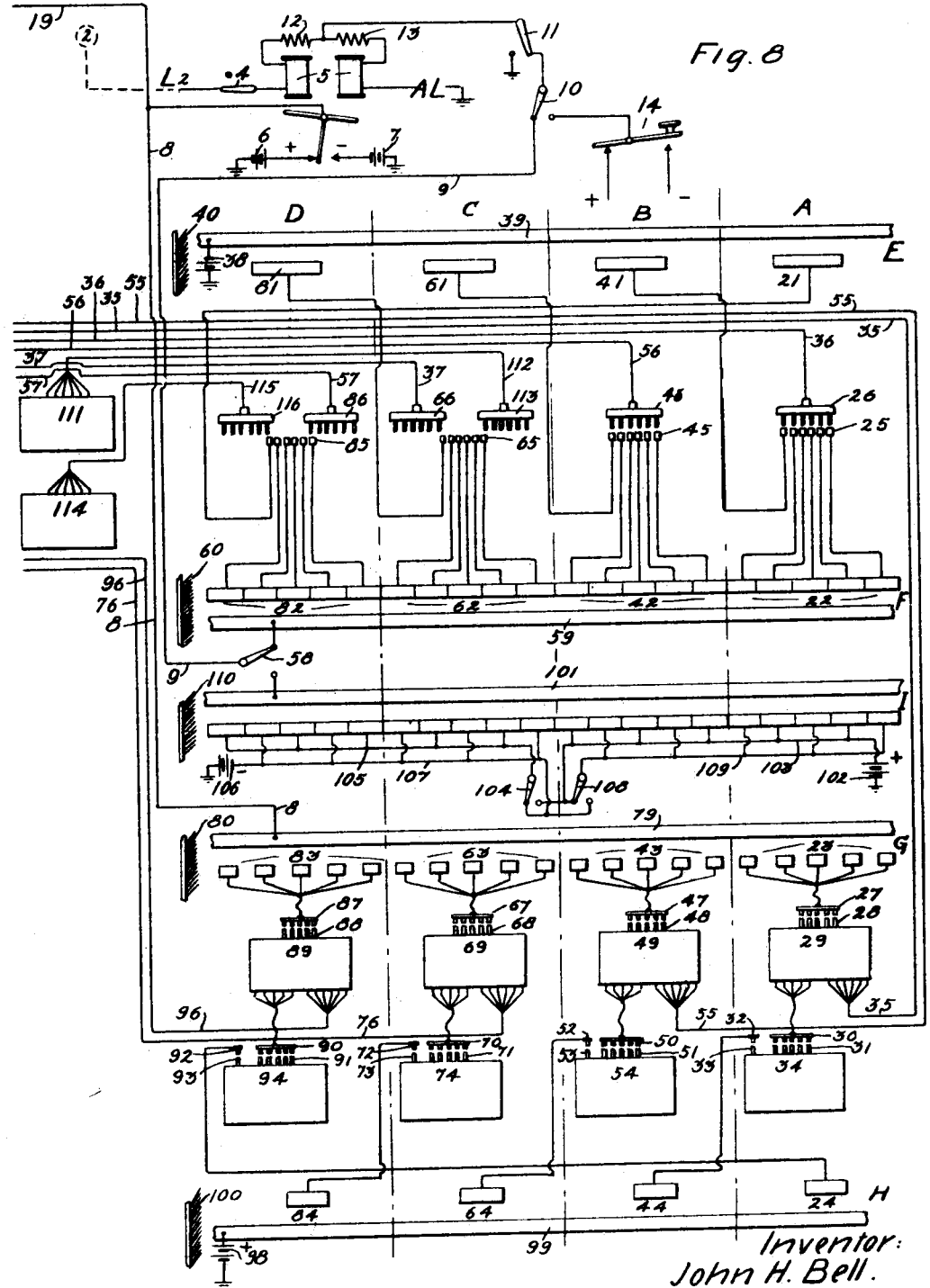
Figure 9:
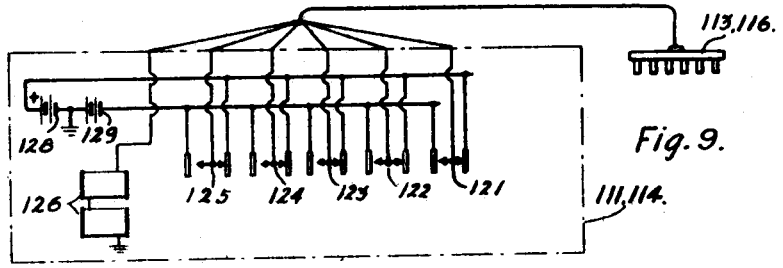
Figure 11:
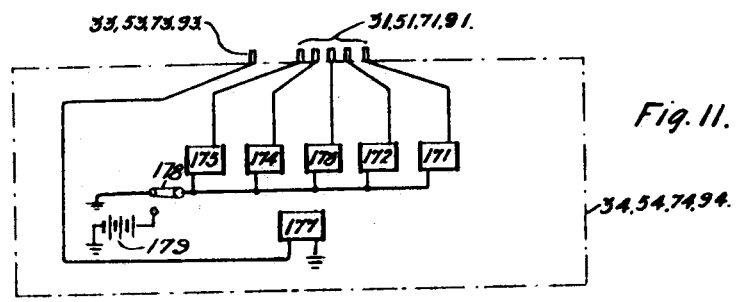
Figure 10:
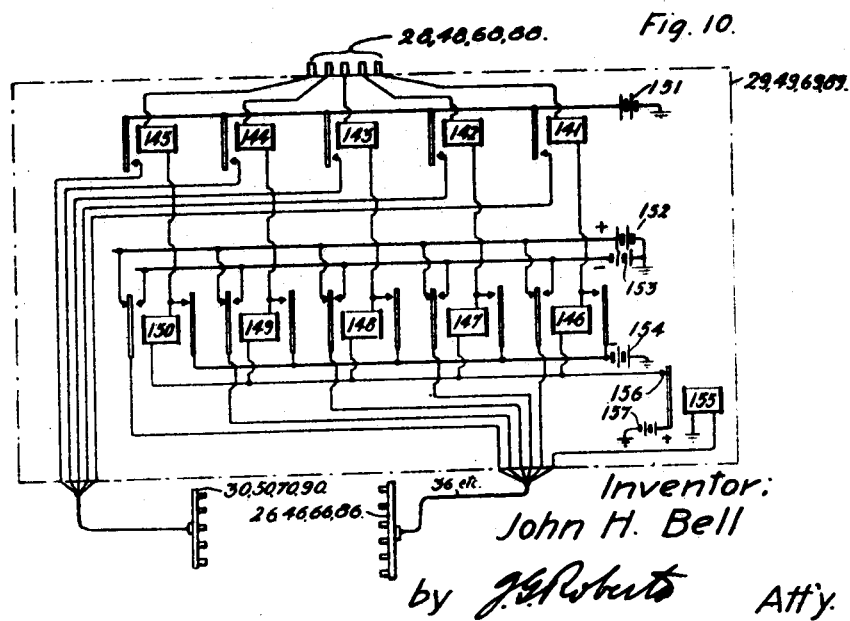

The equipment shown in the drawings will be understood to be located at a central or telegraph repeater station. Figures 1, 2 and 3 taken together represent an arrangement suitable for rendering repeating service between three telegraph circuits each of which is duplexed and multiplexed to quadruple service capacity. Figs. 4, 5 and 6 combined show a duplexed and quadruple multiplexed circuit and two double multiplexed duplex circuits arranged for repeating service. Figs. 7 and 8 combined illustrate two quadruple multiplexed duplex lines arranged for reciprocal repeating service between two arms or two channels each way, while two channels, each way, may be operated between the repeater station and distant stations on each of the lines. In Fig. 9 is shown the circuit arrangement of a telegraphic transmitter suitable for use with the present system. Fig. 10 similarly illustrates a group of impulse storing devices corresponding with receiving, storing and repeating operations for a single channel, while Fig. 11 shows a group of impulse controlled selecting devices suitable for rendering impulses effective with equipment necessary for translating telegraphic impulses into a printed message.

In describing this invention attention will first be directed to the arrangement shown in Figs. 1, 2 and 3. The equipment illustrated in each of these drawings represents the terminal equipment of one duplexed multiplexed telegraph line, which will be understood as extending to a distant station or stations, respectively, and since the equipment of each line is typical, one line with the others, similar characters of reference have been employed in designating like parts or correspondingly associated parts in each of the different drawings. This uniform employment of reference characters extends throughout the several drawings of this invention and to a considerable extent the reference numerals employed have been arranged in predeterminedly progressive groups, thereby rendering the general plan as well as the details of the system more readily understood.

In Fig. 1 the reference character 1 is employed to indicate a distant station connected by means of a line conductor L1 through a switch 4 with a differential duplex equipment formed by a polarized line relay 5, the windings 12 and 13 of a differential galvanometer and an artificial line AL. A multiplex distributer of quadruple capacity comprises contactor sections or paths E, F, G, H and I traversed from right to left by brushes 40, 60, 80, 100 and 110, respectively. Although the distributer has, for convenience, been shown in a developed form, it will be understood to be preferably of a rotary type in which the several contactor brushes are arranged to be rotated through their respective circular paths. The reference characters A, B, C and D are placed to indicate the four sectors, arms, or quadrants of the distributer, each quadrant being arranged to control two telegraphic channels, one outgoing and one incoming with respect to the distant station 1. The different quadrants consist respectively of the equipment positioned vertically in the drawing and separated, for purpose of illustration, by the vertically placed dot and dash lines. For the first quadrant A, one segment 21 is present at the local path or section E of the distributer. Five segments collectively indicated by the numeral 22 are employed at the outgoing or sending section F, and five segments similarly indicated as 23 are present at the incoming or receiving section G. One segment 24 is present at the second local section H, while ten segments, five connected common to a bus conductor 109 and five connected common to a bus conductor 103 are employed in the synchronizing and balancing section I, an alternate arrangement wherein five segments per quadrant are employed for this section is shown in Fig. 8. A six-point plug 26 attached to a six-conductor cable 35 is adapted to be joined with a six-point jack 25, five connections of which extend to the five transmitting segments 22, while the sixth point of this jack is connected to a segment 41 in the second quadrant B of the local section E. The five receiving segments 23 are connected to a five-point plug 27 which may be joined to a five-point jack 28 carried by a group of impulse receiving, storing and repeating devices which may be considered as present in a compartment group or unit 29. A five-conductor cable extends from the group 29 to a five-point jack 30 arranged to form connection with a five-point jack 31 carried by a group or unit of impulse receiving and translating devices indicated by the numeral 34, while a single point jack 33 at 34 is adapted to receive a single point plug 32 which is connected with a segment 44 located in the second quadrant B of the local section H. The apparatus groups 29 and 34 respectively correspond with the arrangements shown in Figs. 10 and 11 of the drawing, which will presently be described, and the purpose of a six-conductor cable 36 extending from the group 29 and the six-conductor cable 35 extending from the plug 25 will also be considered presently.

In each of the three quadrants B, C and D corresponding parts and devices are indicated by numerals regularly progressing in the ratio of twenty numbers as 41, 61, 81, respectively, as compared with the equipment already described in connection with the first quadrant A. Referring to the several brushes of the distributer, the brush 40 in traversing its path E successively joins the segments 21, 41, 61 and 81 with a collector ring 39, for restoring purposes, as will presently appear. The brush 60 of the path F, successively joins the segments comprising the groups 22, 42, 62 and 82 with a collector ring 59 which is connected by way of a switch 58, a conductor 9 and switches 10 and 11 to the apex or neutral connective point intermediate the galvanometer coils 12 and 13 of the duplex equipment. As well understood, current impulses, as will presently be described, when routed over this outgoing path, although being neutralized with respect to the relay 5, act to set up current changes in the line L1 in a manner to become effective with suitable receiving equipment which will be understood as present in the form of a duplex equipment at the distant station 1.

It will be noted that the armature of the relay 5 is arranged to engage oppositely positioned contact stops which are respectively connected with oppositely poled sources of grounded current 6 and 7. Therefore, when the armature of this relay 5 is reciprocated due to impulses comprising changes of polarity transmitted from the distant station 1 over the line L1, corresponding current polarities will be selected at the batteries 6 and 7 to pass by way of the relay armature and a bus conductor 8 to a collector ring 79 of the receiving section G of the distributer. The brush 80 in traversing this path G successively joins the segments comprising the groups 23, 43, 63 and 83 with the collector ring 79, thereby rendering the incoming impulses as translated through the receiving relay 5 properly effective with the storing equipment groups 29, 49, 69 and 89. From these equipments respective repeating operations take place automatically to reproduce in print the messages of the different channels on their respective pilot receiving systems 34, 54, 74 and 94, which printing operations are for the purpose of supervising or observing the service on the four incoming channels from the station 1. Other repeating operations due to the equipments 29, 49, 69 and 89 will be presently described. The brush 100 in traversing the local section H successively connects a collector ring 99 which is energized by current from a source 98, with segments 24, 44, 64 and 84 of the four sectors respectively. The lock-release operations resulting from such energization of these segments will presently appear. The brush 110 in traversing its path through the section I establishes changes of polarity from current sources 102 and 106 with a collector ring 111 for balancing and synchronizing operations which will also be referred to presently.

In Fig. 2 it will be noted that a remote station 2 is connected by means of a line conductor L2 with an equipment identical with the equipment illustrated in Fig. 1, while in Fig. 3 a third remote station 3 is connected over a line conductor L3 with an equipment which is typical of the equipment shown in the Figs. 1 and 2. For convenience of description the service arrangement for the three remote stations provides that two telegraphic channels may be operated in sending from station 1 to station 2, two channels for sending from the station 1 to the station 3, and in a similar manner station 2 may operate two channels in sending to station 1 and two channels in sending to station 3. In a reciprocal manner the station 3 may control two channels in sending to the station 1 and two channels in sending to the station 2. It will therefore be clear that each of the stations 1, 2 and 3 may work at octuple capacity by receiving messages over four channels while simultaneously transmitting outgoing messages over four channels as described.

The description already given in connection with Fig. 1 of the drawing will be considered as having conveyed a sufficient understanding of the repeater equipments illustrated in Figs. 1, 2 and 3. Therefore, the tracing of message routings between the stations will now be considered. It may first be mentioned that distributer equipment, and transmitting and receiving equipments are necessarily present (although not shown) at each of the remote stations, and that the moving parts of such distributer equipments are arranged to act in suitable time relation or synchronism with the associated moving parts of the distributer equipments present at the repeater station, all as well understood in connection with multiplex telegraphic working. The transmission code which has, for convenience, been employed in the present embodiment of this invention is based on the five-unit code of Baudot. In this code, as well known, each character or other operation necessary in the transmission of a telegraphic message is represented by a certain arrangement or permutation of the polarities of five impulses of current. The distributers at a transmitting station render such impulses successively effective with a line circuit while the distributers at a receiving station act in cyclic unison therewith to distribute the effects of such impulses from the line to suitable devices whereby the impulse groups may be recomposed into a printed message.

In tracing one message channel from the station 1 to the station 2, impulses originating at the first station traverse the line L1 and cause changes of current balance in the duplex equipment of this line at the repeater station in response to which the armature of the relay 5 (Fig. 1) is moved to selectively connect the batteries 6 and 7 over the circuit already traced to the collector ring 79 on the receiving section G of the repeating distributer. In phase with the arrival of a series of five impulses over this first channel the receiving brush 80 will, for each impulse, be passing over a corresponding one of the first five segments 23 of this path. The brush thereby completes a current path from the receiving ring 79 to the segments 23 whence the circuits continue over the plug 27, and jack 28 to the storing and repeating equipment 29. Referring to Fig. 10 of the drawing in order to trace the effect of the incoming impulses, it will be seen that the right-hand contact point of the jack 28 is connected serially through the winding of a pilot receiver control relay 141 and the winding of a storing or repeating relay 146, whence the path continues through the normal contacts 156 of a lock release relay 155 to a positively poled and grounded battery 157. The battery 157 corresponds in polarity and potential with the battery 6 at the line relay 5, or these batteries may be, and preferably are, one and the same source of current. In printing telegraphs it is common usage to refer to impulses that result in movement of a device or devices at a receiving equipment as marking impulses, while impulses that do not effect movement of any receiving device or devices are termed spacing impulses. As arranged for convenience of description in the present embodiment of this invention, negative currents correspond with marking impulses while positive currents serve as spacing impulses. Departure from this order of polarities with respect to alternate arms or quadrants of the distributer equipments as desirable in actual service, will, however, be presently discussed. By way of the circuits traced it will be apparent that if the first one of a series of five impulses over the first channel from the station 1 is of negative polarity, the battery 7 at the relay 5 and the battery 157 at the storing equipment 29 will form an accumulative series, thereby causing the operation of the relays 141 and 146 (Fig. 10). After being thus initially operated a self-locking circuit for the relay 146 is established through the right-hand contacts of the relay 146, whereby a battery 154 is substituted for the battery 7 in retaining this relay energized. The left-hand armature of the relay 146 transfers a connection from a positively poled battery 152 to a negatively poled battery 153. This connection is further completed over one strand of the six-conductor cable 36 to the right-hand lug of the six-point plug 26 shown positioned to be joined with the six-point jack 25 of the corresponding channel in quadrant A of the equipment shown in Fig. 2. Through this connection the circuit now being considered continues to the first or right-hand segment of the group 22 of the section F. The brush 60 on arriving over this segment extends the path therefrom to the collector ring 59, thence the circuit continues by way of the switch 58, conductor 9, and the switches 10 and 11 to the apex or outgoing connective point of the duplex equipment present on the line L2. It will be clear that the battery 153 at 29 (Fig. 10) is rendered momentarily effective over the circuit just traced with the line L2 and may thereover set up suitable marking action on a receiving equipment (not shown) at the distant station 2. Returning to consider as an alternate example that the first impulse received from the station 1 may have been of positive instead of negative polarity, although the same circuits as those described would have been completed at the distributer sections or paths G and F the armature of the line relay 5 (Fig. 1) would have caused the battery 6 to encounter the equally opposing current of the battery 157 at 29. Therefore, the relays 141 and 146 (Fig. 10) would not have been affected but continued inert. Under such position of the circuits the positive battery 152 would therefore have become effective over the right-hand contacts of the relay 146 and the circuits traced to the outgoing point on the line L2. At the distant station 2 this current may establish bias of a receiving relay similar to the relay 5, to connect a source of positive current with receiving equipment at that point where opposing current will prevent operation of devices in the same manner as that already described in connection with the equipment 29, all in keeping with the spacing determination for the positive currents as already pointed out. For the last four impulses of a five-unit group the brush 80 will in passing successively over the last four segments of the group 23 at G (Fig. 1) successively complete circuits through the relays (Fig. 10) 142 and 147, 143 and 148, 144 and 149, and 145 and 150, respectively. Each of the last four circuits is typical of the first circuit traced and described through the relays 141 and 146, and the secondary or repeated effects as translated by the relays 146—150 in these groups control respective circuits through the cable 36, plug 26 and jack 25 to the corresponding segments of the group 22 at F (Fig. 2). Therefore as the brush 60 passes successively over the last four segments of this group 22, current effects from either the battery 152 or the battery 153 (Fig. 10), according to the position of the repeating relays 147—150 at 29, become active over the circuits traced with receiving equipment at the distant station 2. In this manner messages on one channel are transmitted from the station 1, received and stored at the repeater station and retransmitted to the station 2.

Referring to the function of the relays 141—145, during such reception and retransmission, the single forward contact controled by each of these relays serves to connect a grounded source of current 151 with a respective strand of a cable joined to the five-point plug 30 which may engage the five-point jack 31, thereby forming a branching or derived circuit control effect from the equipment Fig. 10 to the selecting devices contained in the group 34. The circuit arrangement of the group 34 is shown in Fig. 11. The magnets 171—175 of this group are therefore under control of the relays 141—145 respectively of the equipment 29 and may be considered as representing selecting magnets suitable for controlling character selecting levers, disks or other similar elements of a receiving printer, as well understood in the art. It will therefore be clear that since the relays 141—145 are each controlled in series with a respective one of the repeating relays 146—150 that the selections which may be set up by the magnets 171—175 will correspond with the impulses already described in connection with the operations of transmitting over the first channel from the station 1 to the station 2. The printer controlled by the magnets 171—175 therefore may serve as a pilot receiver in reproducing messages that are sent over this channel from the first to the second station.

Referring to the operations necessary in placing the relays of the equipment Fig. 10, in their normal or restored position after a sequence of five impulses has been received and retransmitted, the winding of the lock release relay 155 is connected from earth over the sixth conductor of the cable 36 and the corresponding points of the plug 26 and jack 25. From this sixth point on the jack 25, a single conductor extends to the segment 41 located in the quadrant B of the distributer section E (Fig. 2), therefore, when the brush 40 arrives over the segment 41 current from a grounded battery 38 connected to the collector rings 39, completes circuit through the relay 155. This relay is thereby operated and separates its contacts 156 to disconnect and permit any of the relays 141—150 which may have been operated as described, to restore and stand ready for the reception of five impulses corresponding with the next character or other operation which may be transmitted over the first channel from the station 1. Further "clearing-out" operations are also necessary at approximately the same time for the pilot receiver control unit 34. For this service the winding of a magnet 177 (Fig. 11) is connected from earth to the jack 33 and the plug 32 engaged therewith (Fig. 1), from which a conductor extends to the segment 44 in the second quadrant of the local section H of the distributer. When the brush 100 arrives over this segment 44 the battery 98 is thereby connected over the circuit traced, to effect the operation of the magnet 177. This magnet controls mechanism (not shown) whereby a printing cycle is started which disposes of a selection which may have been previously set up on the magnets 171—175 as described. These magnets are thereby placed in condition to be acted upon by another sequence of five impulses, while the printing operations initiated by the starting magnet 177 continue automatically to finally place the magnet 177 in condition to respond and initiate a next printing cycle.

In the transmission of messages from the station 2 to the station 1 over a first channel in that direction, operations similar to those already described in connection with the transmission of messages in the opposite direction between these stations will take place. Briefly described impulses originating at the station 2 (Fig. 2) traverse line L2 and affect the line relay 5 to selectively connect the batteries 6 and 7 by way of the bus conductor 8 to the collector ring 79 of the distributer receiving section G. For this first channel five incoming impulses corresponding with a character to be selected will arrive in phase with the impulses over the first channel from station 1 to station 2 as already described. Accordingly the brush 80 will be traversing the five segments 23 of the distributer section G (Fig. 2) at this time. Therefore successive circuits will be completed by way of the plug 27 and jack 28 to the signal storing equipment 29. For the operation of the associated pilot receiver, connections extend from the equipment 29, by way of the plug 30 and jack 31 to the receiver selecting equipment 34, while repeating operations from the equipment 29 become active over the cable 35, to sector A (Fig. 1), thence over plug 26 and jack 25, to the five segments 22 of the sending distributer, section F. The brush 60 in passing over the five segments 22 completes circuits prepared by the associated equipment 29, from these segments to the collector ring 59, thence by way of switch 58, conductor 9 and switches 10 and 11, to the outgoing connective point on the duplex equipment of the line 1. While current impulses over the circuit traced are neutralized or non-effective in the relay 5 as already described, they are, however, effective to set up current changes in the line L1 whereby suitable receiving devices at the distant station 1 will be responsive thereto in translating the impulse into a printed character.

The equipments 29 and 34 shown in Fig. 2 of the drawing are identical to the corresponding equipments shown in Fig. 1. Referring to Fig. 10 of the drawing, it will be noted that the numbers 29, 49, 69 and 89 employed to designate this equipment correspond with the reference numbers employed to designate this equipment in each of the four channels shown in the different figures of the drawing. It will also be noted that the five-point plug connected by means of a five-point cable with the front contact stops of the pilot control selecting relays 141—145 is indicated by the numbers 30, 50, 70 70 and 90 which correspond with the numbers by which similar plugs are indicated in the different quadrants or sectors of the drawings. The numbers 26, 46, 66 and 86 by which the six-point jack which connects from the five receiving and retransmitting relays 146—150 and to the cut-off or lock release relay 155, correspond with the numbering for similar plugs in the different quadrants shown in the various figures of the drawing. In a corresponding manner the selecting equipment shown in Fig. 11 is indicated by the numbers 34, 54, 74 and 94 which correspond with the numbers by which similar equipments are indicated in the different channels of the several drawings, while the five-point jack for connecting to this equipment is indicated by the numbers 31, 51, 71 and 91, and the single point jack for this equipment is indicated by the numbers 33, 53, 73 and 93, all of which reference characters correspond with the numbers applied to like equipment in the various channels shown on the drawings.

Since the operations taking place at the repeater station for messages transmitted from the station 2 to the station 1 over the first channel under consideration are identical with the operations already described in connection with messages transmitted from station 1 to the station 2, detailed or further description of these operations will not be necessary.

In considering other channels between the first and second stations, it will only be necessary to describe their general routing through the repeater equipment. The second channels between these stations correspond with the distributer quadrants B in the first and second figures of the drawing. Therefore, messages originating at the station 1 in its second outgoing channel operate the line relay 5 to establish corresponding changes of potential in the collector ring 79 of the distributer section G in phase with the passing of the brush 80 over the five segments 43. The brush 80 renders these impulses effective with the equipment 49 and the pilot receiving selectors 54. In turn the storing equipment 49 sets up current changes over a five-conductor cable 56, to Fig. 2, thence over a plug 46 and a jack 45 to the five segments 42 of the distributer section F. The brush 60 in passing over these segments completes successive circuits by way of the collector ring 59 and the circuits already traced to the outgoing connective point on the line L2. Message impulses over the second channel outgoing from station 2 work the associated line relay 5, thereby setting up current changes on the collector ring 79 of the distributer section G (Fig. 2) from which point the brush 80 renders these impulses successively effective with the five segments 43 thence by way of the plug 47 and the jack 48 with the storing equipment 49. This equipment in turn controls the pilot equipment 54 and through the cable 55, to Fig. 1, thence over plug 46 and jack 45, effects changes of current on the five segments 42 at the distributer section F. Brush 60 in turn renders these current changes effective with the line conductor L1 over the circuits already traced.

In connection with service between the station 1 and the station 3, the third outgoing channel from station 1 corresponds with distributer quadrant C in Fig. 1 and with distributer quadrant A in Fig. 3. The general routing for this channel is by way of line circuit L1, relay 5, thence incoming to the distributer section G, the brush 80 completing circuit in a proper manner to the segments 63 which are connected over plug 67 and jack 68, with storing devices 69. From the equipment 69 control of the pilot equipment 74 is effected through plug 70 and jack 71, while repeating operations take effect over a cable 37 to Fig. 3, thence over plug 26 and jack 25 to the segments 22 of the distributer section F. From this point the brush 60 renders the current condition as established on these segments effective over the switch 58, conductor 9 and switches 10 and 11, with the outgoing connective point on the duplex equipment of the line L3, thereby setting up changes in the line L3 as already described in connection with the lines L1 and L2, to control suitable receiving equipment at the distant station 3. Message impulses by way of the first outgoing channel from the station 3 cause the associated line relay 5 to establish current changes on the collector ring 79 of the distributer section G (Fig. 3). The brush 80 of this section in phase with the arriving impulses renders these current changes effective over the segments 23, plug 27 and jack 28 with the equipment 29. From this equipment the pilot unit 34 is controlled as already described in connection with the other channels, while current changes are established in the conductors of a cable 75 which extends to quadrant C (Fig. 1) and there connects through the plug 66 and jack 65 to the five segments 62 of the distributer section F. The brush 60 in traversing these segments renders these current conditions effective with the line circuit L1 over the circuits already traced.

The fourth outgoing channel from the station 1 is routed through quadrant D of the equipment shown in Fig. 1 and through the quadrant B of the equipment shown in Fig. 3 to the distant station 3. Impulses over this channel become effective with the segments 83 of the distributer section G, thence by way of plug 87 and jack 88 with the storing equipment 89, and from that point by way of the plug 90 and jack 91 with the pilot control selectors 94. From the equipment 89 repeated impulses traverse the conductors of a cable 57 to Fig. 3 of the drawing, thence over the plug 46 and jack 45 to the segments 42 of the distributer section F. From this point the brush 60 renders these current changes effective over the circuits already traced to the station 3. In a reciprocal manner messages over the second outgoing channel from station 3 become effective with the segments 43 of the distributer section G (Fig. 3). The brush 80 of this section further completes these circuits through the plug 47 and jack 48 to the storing and repeating devices 49. From the latter point the pilot equipment 54 is controlled by way of a plug 50 and jack 51, while repeated currents act over a cable 95 which extends to Fig. 1, thence through plug 86 and jack 85 to the five segments 82 of the distributer section F. From this point the brush 60 establishes the current condition of these segments effective over circuits already traced to the distant station 1.

In describing service which may be carried on between the stations 2 and 3, a third outgoing channel from the station 2 corresponds with the quadrant C in both Fig. 2 and Fig. 3 of the drawing. The routing of this channel through the repeater equipment is from the station 2 over the circuits already traced to the distributer section G. In the quadrant C of this section the brush 80 renders the impulses for this channel effective over a plug 67 and jack 68 with the storing and repeating equipment 69. From this point the selecting devices 74 are controlled through a plug 70 and a jack 71, while repeating operations take place over a cable 77 to Fig. 3, thence over plug 66 and jack 65 to segments 62 of the distributer section F. From this point the brush 60 renders these current changes effective over circuits already traced to the distant station 3. Impulses over the third outgoing channel from the station 3 become effective over circuits already traced, with the distributer section G. Brush 80 of this section in passing through the quadrant C establishes such incoming impulses effective over the segments 63, plug 67 and jack 68, with the storing equipment 69. This storing equipment in turn controls the pilot control equipment 74 by way of jack 70 and plug 71, and renders repeating changes over a cable 76 to Fig. 2 of the drawing, thence by way of plug 66 and jack 65 to the five segments 62 of the section F. The brush 60 renders the current changes to these segments effective as described with equipment at the distant station 2.

The fourth outgoing channel from the station 2 works through distributer quadrant D of the equipment shown in Figs. 2 and 3. Impulses arrive as already described at the distributer section G (Fig. 2) and become effective over the brush 80 with the segments 83, thence by way of plug 87 and jack 88 with the storing equipment 89. from the storing equipment 89 current effects are established over the plug 90 and jack 91 with the pilot control equipment 94, and a cable 97 conveys repeated impulses from the equipment 89 to Fig. 3, thence by way of plug 86 and jack 85 with segments 82 at distributer section F. The brush 60 at this section establishes such repeated effects with the line circuit L3 in a manner similar to that already described in connection with the other channels. Current impulses over the fourth channel from the station 3 become effective over the circuits already described, with the distributer section G (Fig. 3), thence by way of the brush 80 and segments 83, plug 87 and jack 88 with the storing equipment 89. From the latter point, pilot storing equipment 94 is controlled by way of plug 90 and jack 91, while repeating operations take effect over the cable 96 to Fig. 2, thence over plug 86 and jack 85 to the five segments 82 of the section F. Brush 60 of this section causes these repeated impulses to become effective with the distant station 2 in a manner similar to that already described.

From the foregoing description, it will be clear as previously stated, that by means of the equipment shown in Figs. 1, 2 and 3 of the drawing, two telegraphic channels may be operated from the station 1 to the station 2, two channels from the station 1 to the station 3, two channels from the station 2 to the station 1, two channels from the station 2 to the station 3, and two channels from the station 3 to the station 1, also two channels from the station 3 to the station 2.

Clearing-out operations for the storing and repeating equipment units and the selecting pilot control units having been described in connection with the first two channels considered, detailed description of these operations as they apply to the channels last described will not be necesary; therefore only the general relation of the clearing-out operations for all of the channels will now be considered. Accordingly, for the four sending channels to the line L1 the segments 41, 61, 81 and 21 of the local section E (Fig. 1) serve respectively in momentarily disabling the storing and repeating equipment units 29, 49 of the line L2 and the corresponding units 29 and 49 of the line L3. In a similar manner the corresponding segments 41, 61, 81 and 21 at the equipment of the line L2 (Fig. 2) similarly release the equipment units 29 and 49 of the line L1 and 69 and 89 of the line L3 respectively, while the local segments 41, 61, 81 and 21 associated with the line L3 (Fig. 3) serve in respectively disabling the equipments 69 and 89 of the line L1 and 69 and 89 of the line L2. The local segments 44, 64, 84 and 24 of each line equipment serve to momentarily disable or restore the pilot control selecting units 34, 54, 74 and 94 associated with the same line equipments respectively.

Referring to the distributer section I, it will be noted that for each of the quadrants A, B, C and D, ten segments are provided instead of five segments as shown in the sections F and G (except in Fig. 8 as already mentioned). It will also be noted that so long as the blade of the switch 58 is connected to its uppermost point as shown in the drawing, that the distributer section I will stand disconnected and therefore idle. At such times as it may be necessary to adjust the balance of the duplex equipment or send out impulses for synchronizing the multiplex equipment at the repeater station with the multiplex equipment at the corresponding distant station, the blade of the switch 58 may be moved to its lowermost point, thereby establishing a connection from the collector ring 101, by way of the conductor 9 with the outgoing connective point on the duplex equipment of the associated line, as in Fig. 1 the line L1. During the time the circuits may be in this position, the brush 110 in transversing the path or section I will in passing through the quadrants A and B establish a positively poled and grounded battery 102 with the line circuit L1. This is possible since the battery 102 is connected by means of a bus-conductor 103 with the even numbered segments in these quadrants, while the switch 108 when positioned as shown in the drawing, connects the bus conductor 103 with a second bus conductor 109 which is common to the odd numbered segments in the quadrants A and B. On arriving in and passing through the quadrants C and D the brush 110 establishes a negatively poled source of grounded battery 106 with the line conductor L1. This will be clear since the battery 106 is connected over a bus conductor 107 with the odd numbered segments in the last two quadrants, while a switch 104 positioned as shown in the drawing, connects the current bus 107 with a bus conductor 105 which is connected to the even numbered segments in the quadrants C and D. For each revolution of the distributer, one positive and one negative impulse of current may therefore become successively effective with the line L1. If now the blades of the switches 104 and 108 are moved to their right-hand contact points the positively poled current bus 103 will be disconnected from the bus conductor 109 and connected over the switch 104 with the bus conductor 105, while the negatively poled current bus 107 is disconnected from the bus 105 and connected over the switch 108 with the bus conductor 109. This setting of the switches 104 and 108 establishes a negative current condition on each one of the odd numbered segments and a positive current condition on the even numbered segments throughout the four quadrants of the distributer, and since there are ten segments in each quadrant, a complete revolution of the brush 110 will establish twenty negatively poled and twenty positively poled current impulses effective in alternate order with the line circuit L1. These current changes to the duplex equipment on the line L1 permit balancing adjustments of the duplex equipment on the line L1 and also the initial establishing of synchronizing operations between the multiplex equipment of the repeater station and the remote station as well understood in the art.

The switch 11 connected in the outgoing lead of the line L1 serves in a well known manner for disconnecting the transmitting lead from the sending equipment of the distributer and connecting it to earth in order that the balancing adjustments of the duplex equipment at the repeater station may be carried out during such time as current reversals may be sent out from the station 1 in a manner similar to that described for the transmission of impulses from the distributer section 1 at the repeater station. The distributer section 1 when employed in connection with synchronizing operations may be conditioned to send out either the low frequency or the higher frequency current reversals as already described, and as well known such reversals may control suitable devices for bringing the speed of a distant distributer into proper phase relation with the speed of the distributer at the repeater station.

A receiving device 16 shown in Fig. 2 which may, for convenience, be a Wheatstone recorder, is arranged to be controlled by a switch 15 in such a manner that when this switch is positioned to engage its left-hand contact, a leak circuit will be completed by way of a conductor 17 to the bus conductor 8 which extends from the armature of the relay 5 of the line 1 (Fig. 1). During the time the switch 15 is in this position the recorder 16 will reproduce markings which will correspond with all impulses received over each of the four channels from the distant station 1. By moving the switch 15 to engage its intermediately positioned contact point, a similar leak circuit completed over a conductor 18, renders the recorder 16 effective to reproduce markings corresponding with impulses transmitted over each of the four channels from the station 2. In a similar manner when the switch 15 is positioned to close its right-hand contact, incoming impulses corresponding with each channel from the station 3 become effective over a conductor 19 and are reproduced by the recorder 16. This recorder is principally for supervision purposes.

The three-point switch 10 connected in the outgoing lead 9 of the line circuit shown in each figure of the drawing is for the purpose of switching the line-end of this lead from the respective transmitting distributer section F to a respectively associated telegraph key 14, the normal and forward contacts of this key being respectively connected with suitable sources of grounded line battery not shown, but indicated by the conventional plus and minus signs at these contacts. It will be understood that on moving the switch 10 to engage its right-hand contact point the key 14 may be employed for communicating by manual or Morse operation with the associated distant station, the recorder 16 may be switched in as described, for use with such Morse working. This service being resorted to more particularly in connection with clearing of circuit troubles, duplex balancing operations, and instructions relative to starting the various distributer equipments at the beginning of a day, etc., as well understood in the art.

Although an individual receiving equipment for service observing or pilot purposes has been shown, for convenience of description, in connection with each one of the various channels, it will be understood that instead of employing the several equipments 34, 54, 74 and 94 as shown in each figure of the drawing, only a limited number of these equipments would ordinarily be required. In covering the supervisory service with a smaller number of pilot equipments the repeater attendants may interchange the connections from these pilot equipments by respectively inserting the various plugs 30 and 32, 50 and 52, 70 and 72, and 90 and 92 with the corresponding jacks, 31 and 33, say, of a single pilot equipment, it being understood that during the time a pilot equipment may not be included with a telegraphic channel, the corresponding plugs 30 and 32, 50 and 52, 70 and 72, and 90 and 92 may stand disconnected and idle.

Referring to Figs. 4, 5 and 6 of the drawing, the equipment shown in these drawings is typical of the equipment shown in the first three figures of the drawing and already described, except that the multiplex capacity for the line L1, Fig. 4, and the line L3, Fig. 6, is only of double or quadruplex capacity relative to the line 2 as shown by the sectors A, C and B, D of the distributer equipment for these lines, respectively. The equipment for line 2 shown in Fig. 5 is arranged for octuple multiplex capacity and is typical of the equipment shown for line 2 in the drawing, Fig. 2. Since the various portions of the equipment and devices shown in the Figs. 4, 5 and 6 are typical of the equipments already described, detailed consideration will not be necessary, therefore only the matter of the general routing of the various channels of the different line circuits through the repeater equipment will be discussed. It may first be pointed out that a uniform speed is to be maintained with respect to the travel of the brushes of the several distributer equipments, and as indicated in Fig. 4, sectors B and D may be idle with respect to the line 2, while sectors A and C of Fig. 6 may similarly be idle with respect to the line 2. Messages routed over a first channel from station 1 to the station 2 are effective through sectors A of the distributer equipment of both the lines L1 and L2 and, in a converse manner, messages routed over a first channel from the station 2 to the station 1 are effective through the same sectors A of the multiplex equipment of the lines of these stations. Messages over a second channel from the station 1 to the station 2 are routed by way of sectors C of the respective equipments, and inversely, messages over a second channel from the station 2 to station 1 are routed over the same sectors of the distributer equipment on each of these lines, L2 and L1. For service between the station 2 and the station 3, Figs. 5 and 6 respectively, message impulses over a first channel from station 2 to station 3 are routed through sectors B of the distributers of line L2 and line L3. Messages over a first channel from the station 3 to the station 2 are routed inversely through the same distributer sectors B of the corresponding line circuits. A second channel from the station 2 to the station 3 is routed through the distributer sectors D of line L2 and line L3 and, conversely, the impulses of a second channel from the station 3 to the station 2 are routed in the opposite direction through the sectors D of the associated distributer equipments.

For the local or clearing-out operations necessary in connection with the repeater equipments 29, 49, etc., and the pilot controlled equipments 34, 54, etc., the distributer sections E and H are connected to control such operations in a manner typical of similar control already described in connection with the first three figures of the drawing.

The recorder 16 shown in Fig. 5 may be connected by means of the switch 15 in leak relation from either one of the lines L1, L2 or L3. The grounding switches 11 and the key controlling switches 10 and the keys 14 respectively serve to render service already described in connection with the first three figures of the drawing. The current polarity reversing distributer section I in each of the figures under discussion may also be employed in the manner already described.

The operation of the receiving distributer sections G and the sending sections F being similar to the corresponding operations already described, it will be clear that by means of the differential duplex and multiplex equipments shown in connection with the three lines, L1, L2 and L3 of the Figs. 4, 5 and 6 respectively, that the station 1 may operate two channels to the station 2, while station 3 may also operate two channels to the station 2, and in turn the station 2 may operate two channels to the station 1 and two channels to the station 3.

Referring to Figs. 7 and 8 of the drawing, the duplex and multiplex equipment present for two remote stations connected over line conductors L1 and L2, respectively, is in general, similar to the equipments already described. In the present arrangement, however, it is provided that while each of these lines is equipped to quadruple capacity in each direction, that suitable impulse transmitting devices may be employed at the repeater station for operating from that point over two channels respectively to each of the distant stations. In discussing this matter of transmitting messages from the repeater station, the reference numbers 111 and 114 respectively indicate transmitting equipment units, the circuit detail of which is illustrated in Fig. 9 of the drawing. In this figure the reference numerals 111 and 114 apply to the equipment as a unit, while reference characters 113 and 116 are employed to indicate a six-point jack which is connected by means of a six-conductor cable with the proper devices of this transmitter unit. Briefly described, the circuit arrangement of the transmitter comprises oppositely poled and grounded batteries 128 and 129 which are respectively connected to five normal and five forward contact stops, while five movable members which are arranged to selectively engage the contact stops are indicated by the reference characters 121—125. These members may be understood as under the control of a perforated tape and each member is connected respectively with a point of the associated plug 113. A magnet 126, which is connected from the last or sixth point on the plug 113 to earth, serves for clearing-out or releasing operations in connection with the movable contact members 121—125 and will presently be described. As arranged in the Figs. 7 and 8, two outgoing message channels from the station 1 to the station 2 may be routed through the distributer sectors A and B of each line equipment, while two channels operated from the station 2 to the station 1 may be routed in a reversed direction over the same sectors A and B of the distributer equipments. A third channel from the station 1 may be operated to the repeater station over the sector C of the distributer equipment of the line L1. In tracing the routing of impulses over this channel, current changes set up by operation of the line relay 5, as already described, affect the collector ring of the distributer receiving section G and when the brush 80 of this section passes over the five segments 63 of the sector C, such current changes become effective over the plug 67 and jack 68 with the repeating unit 69. From this unit circuit control is further extended over the plug 70 and the jack 71 to operate the pilot unit 74 which acts in the manner already described to recompose the impulses in the form of a printed message. Although a cable 37, which extends from the repeating unit 69, is connected with a six-point plug 66 in Fig. 8, it will be understood that this plug may, for the present, stand disconnected and idle. In transmitting over a first channel from the repeater station to the station 1, the six-point plug 113 may be inserted in the jack 65, the plug 113 being connected by means of a six-conductor cable 112 with the transmitting unit 111, it will be clear that changes of current polarity which may be prepared on the contacts 121—125 by a transmitting tape will become effective with the five segments 62 of the sending distributer section F. Therefore, when the brush 60 of this section passes over these segments, the current polarities prepared at the transmitter 111 become effective over the collector ring 59, and switches 58, 10 and 11 with the outgoing connective point on the duplex equipment of the line L1 in a manner to control suitable receiving devices at the distant station 1, as already described. In a corresponding manner messages over a second channel from the station 1 to the repeater station are routed through a distributer sector D to affect the repeater unit 89 and in turn the receiving devices 94, while messages transmitted over the second channel from the repeater station to the station 1 may originate on the transmitter 114 to traverse a cable 115 and the plug 116 which will be understood as inserted in the jack 85. The points of this jack connect to the five segments 82 of the sending section F, from which point current changes originating at the transmitter 114 may become effective with the line circuit L1 over paths already traced. During such operation over the last two channels described, it will be understood that the six-point plug 86 (Fig. 8) which is connected to the repeater unit 89 by means of the cable 57 will also continue disconnected and idle. In working two channels from the repeater station to the distant station 2 (Fig. 8) the equipment employed is identical with that shown and already described in connection with Fig. 7. It will therefore be sufficient to mention that messages incoming from the station 2 are received on the equipment 74 and 94 which respectively correspond with the two incoming channels, while messages originating on the transmitters 111 and 114 are routed outwardly over the sending portion of the sectors C and D to the distant station 2 and inversely correspond respectively, with the two channels in the opposite direction. For observing service on the four channels between the stations 1 and 2, the pilot equipments 34 and 54 respectively associated with the line L1 and the line L2, are active as already described in connection with the first figures of the drawings.

The local distributer section E in each of the Figs. 7 and 8 serves to clear out either the repeating units 29—49, etc., or the transmitters 111 and 114. In clearing out a previous set-up of the transmitter contacts, let it be assumed that the brush 40 of the section E is present over the segment 81; accordingly, current from the battery 38 will complete circuit over the collector ring 39, brush 40, the segment 81 to the sixth point on the jack 65 of the distributer sector C. Since the plug 113 is now present in this jack, the circuit continues over the cable 112 to the transmitter 111 (Fig. 9), at which point the path continues through the winding of the release magnet 126 to earth. Mechanism, not shown but controlled by the release magnet, causes movement of the controlling tape and also releases the contact members 121—125 and these contacts may then be again controlled by the tape in setting up another combination of five impulses. In a similar manner a release control circuit for the transmitter 114 is completed when the brush 40 arrives over the segment 21 in the sector A of the distributer section E.

As shown in the drawing, it will be obvious that in the sector C (Fig. 8) the plug 66 may be substituted for the plug 113 with respect to the jack 65. This would result in disabling transmitter 111 (Fig. 8) while substituting therefor repeated impulses from the line L1, as established through the unit 69 in sector C of Fig. 7. In a similar manner, the substitution of the plug 86 for the transmitter plug 116, in the jack 85 of the sector D (Fig. 8) would result in disabling the transmitter 114 and the rendering of repeating service from the line L1, by way of the equipment unit 89, with the corresponding channel outgoing to the line 2. A similar change in connection with respect to the jacks 65 and 85 of the sectors C and D (Fig. 7) would result in disabling the transmitters 111 and 114 and the establishment of repeating service on two channels from the station 2 to the station 1. During the time the equipment may be in the last assumed position, four channels would be operable from the station 1 to the station 2 while four channels would be operable in the opposite direction from the station 2 to the station 1, the receiving units 34, 54, 74 and 94 in each figure of the drawing serving, under this condition, as pilot receivers for the respective channels. The clearing-out operations for the pilot equipments 34, 54, 74 and 94 continue under the control of the segments 44, 64, 84 and 24 respectively of the local distributer section H and operate in a manner similar to that already described irrespective of the fact that these pilot devices may be either serving for the supervision of through messages or as terminal instruments for the receipt of messages from the distant stations as described.

In connection with Figs. 7 and 8, it will be understood that the distributer section I, switches 10 and 11, key 14 and recorder 16 may each be respectively employed for the service operations, as already described in connection with the other figures of the drawing. In Fig. 8 it will be noted that the distributer section I differs from the corresponding sections shown in the other figures of the drawing in that only five segments are employed in each of the sectors A, B, C and D instead of ten segments. The arrangement of connections to alternate segments is, however, the same as that shown in the first figures; therefore only a difference in service results is effected by reducing the number of segments. This arrangement provides that during the time the switches 104 and 108 are in the position shown, the positively poled battery 102 will be connected with the line L2, during the time the brush 110 is traversing the quadrants A and B, while the negatively poled battery 106 will be connected with this line during the time the brush 110 is traversing the sectors C and D. Therefore, during each complete revolution of this distributer brush, one positive and one negative impulse of current will become effective with the line L2. This condition, it will be noted, is the same as that resulting with the corresponding positioning of the switches 104 and 108 with respect to the first seven figures of the drawing. During the time the switches 104 and 108 may be in their respective right-hand positions, battery 102 will be connected with the odd numbered segments throughout the four sectors, while the negative battery 106 will be connected to the evenly numbered segments in the four sectors. Since there is a total of twenty segments in the four sectors, each revolution of the brush 110 will result in an application of ten negative and ten positive impulses of current in alternate order with the line L2. The employment of five segments per quadrant in this distributer section permits the sending of current reversals which will be, in point of frequency, uniform with reversals which may be employed in the transmission of message impulses. Therefore in bringing about a synchronous relation between the distributers at the repeater station and the distributers at the distant stations, the sending of impulses from the repeater equipment at the higher frequency rate permits the distant station to first bring the moving parts of the distributer at that point into proper speed relation with the distributer at the repeater station. In arriving at this speed relation, either the well known stroboscopic or any other method known in the art may be employed, following which the switches 104 and 108 at the repeater station may be moved to their left-hand positions to permit sending out of the slow reversals of current already described. These reversals may control suitable phase finding devices at the remote station in a manner to automatically bring the associated distributer equipment into proper phase or cyclic time position with the distributer equipment at the repeater station. When desirable, this arrangement of the equipment at the distributer section I may be substituted for the arrangement shown in each of the first Figs. 1–7 of the drawing.

Referring to the switches 4 respectively associated with the line circuit in each of the several figures of the drawings, these switches, in addition to being employed in circuit testing operations, etc., may in the present system be used in connection with the synchronizing of the distributer equipments, common to the different lines at the repeater station. In carrying out such synchronizing operations it will be understood that the different distributers may be operated by means of a phonic wheel or La Cour motor controlled by a tuned fork. Let it be assumed that it is desired to start the distributers at the repeater station and that the distributers on the lines L1 and L2 of Figs. 1 and 2 will first be brought into proper phase relation, one distributer with the other. All of the plugs, 26, 46, 66, 86, 27, 47, 67, 87, 30, 32, 50, 52, 70, 72, 90 and 92 should first be removed from their respective jacks at each distributer equipment. In the distributer sector A (Fig. 1), the plug 113 of the transmitter 111 (Fig. 7) may be inserted in the jack 25 and the plug 27 may be inserted in the jack 28 of the unit 29, while the switch 4 of each of the lines L1 and L2 may be moved to open the associated line circuit. At sector A of the multiplex equipment of the line L2 the plugs 27, 30 and 32 may be replaced in their respective jacks 28, 31 and 33, and the plug 26 also reinserted in its jack 25. Under this condition of the circuits impulse combinations prepared on the transmitter 111 may become effective by way of the segments 22 over the brush 60 with the collector ring 59 of the distributer section F. From the collector ring 59, these impulses continue over the path formed by the switches 58, 10 and 11 to the apex or outgoing connective point on the duplex equipment of the line L1. Since this line is, at this time, disconnected at the switch 4, the left-hand winding of the line relay 5 is accordingly open-circuited, therefore, the impulses from the transmitter 111 may only complete circuit through the right-hand coil of this relay over the artificial line AL to earth. These impulses will reciprocate the armature of the relay 5 in accordance with their polarity, thereby selectively connecting the batteries 6 and 7 over the bus-conductor 8 with the collector ring 79 of the receiving station G of the distributer. The brush 80 of this section in passing over the five segments 23 will render these impulses effective with the repeating unit 29. From this equipment repeating effects take place over the cable 36 to the sector A of the equipment at line L2, at which point the circuit continues over the plug and jack 25 to the segments 22 of the distributer section F. The brush 60 of this section in passing over the segments 22 completes circuit therefrom to the collector ring 59, thence the path continues by way of the switches 58, 10 and 11 to the outgoing connective point at the duplex equipment of the line L2. Since this line is disconnected, as assumed, at the switch 4, the right-hand coil of the line relay 5 is thereby disconnected and these impulses may ony act through the right-hand winding of the relay 5 and the artificial line AL to earth in the same manner as that already described in connection with the relay 5 of the line L1. The armature of the relay 5 is accordingly biased in phase with the polarity of the impulses under consideration, to set up current changes on the collector ring 79 of the associated receiving section G, and as the brush 80 of this section passes over the segments 23, these current changes become effective through the repeating unit 29 with the pilot printer 34. It will be pointed out that the cable 35 which extends from the repeater unit 29 (Fig. 2) to the plug 26 (Fig. 1) as already mentioned, is now disconnected and idle. It will be clear that by means of transmitter 111 and the receiving printer 34 (Fig. 2), operations known as orientation of the brushes of the distributers may be carried out in order that the brushes may be finally positioned at an intermediate point with respect to a permissible tolerance of variation of the speed relation between the different distributer equipments, all as well known in the art. In this manner the proper synchronizing and phase relation between the distributer of the line L1 and the distributer of the line L2 may be checked and accurately determined.

From the foregoing description it will be clear that by transferring the plug 113 of the transmitter 111 to the jack 65, inserting plug 67 in jack 68 in the sector C of the equipment at the line L1, opening switch 4 of the line L3 (Fig. 3) and inserting the plugs 26, 27, 30 and 32 in the respective jacks 25, 28, 31 and 33 of the sector A of the line L3, that the transmitter 111 and the printer 34 of the sector A (Fig. 3) may be employed for checking the synchronous phase relation between the distributer of the line L1 and the distributer of the line L3. During the latter operations the plugs 26, 27, 30 and 32 may be removed from their respective jacks in the sector A (Fig. 2) and the plug 27 from its jack 28 (Fig. 1).

After proper phase relationship has been secured between the different distributer equipments at the repeater stations, the switches 4 of the line circuits may be closed and operations carried out to establish the proper synchronous phase relation between the distributers at the repeater station and the distributer equipments at the several remote stations all as well understood in the art.

With regard to the matter of polarity relation between the various sectors of the distributer equipments, although, for convenience of description, the same polarities with respect to marking and spacing have been shown and described in the different sectors of the present system, it will be understood that such polarity relation for commercial service may be reversed with respect to alternate sectors. Accordingly if impulses of positive polarity are employed for marking purposes and negative impulses for spacing intervals in the first sector A, the opposite relation would be desirable in the second sector B in which negative impulses may correspond with marking operations, while positive impulses may correspond with spacing intervals, the same alternate relation continuing between the sectors B and C and sectors C and D of the distributer equipments. As well understood in the art, such alternate arrangement of polarities provides that during periods the transmitters may be idle on all of the channels four changes or alternations of current polarities may continuously take place over the line circuits during each revolution of the distributer brushes. Such changes of polarity serve to operate automatic phase finding devices (not shown) whereby the distributer equipments at the several stations may be maintained in proper synchronous phase relation one station with another, as well understood in the art. Ordinarily no synchronizing equipment is required at the repeating station since this station may act as the pace setting station with respect to the distributer equipments at the various remote stations.

In Fig. 11 a switch 178 serves for substituting a battery 179 for the earth connection common to the selecting magnets 171—175, and when the battery is connected the jack 31 of this equipment may directly receive the plug of the receiving section G, as the plug 27 of sector A, without the interposition of the repeater unit 29. The jack 33 of the printer equipment continuing connected by means of the plug 32 with the segment 44 of the distributer local sector H. The substitution of a battery for the earth connection to the selecting magnets of the units 34, 54, etc., renders this equipment selectively responsive to marking and spacing impulses in a manner corresponding with the translation of marking and spacing impulses by the repeating units 29, 49, etc. This order of connecting the printer equipments may be carried out in connection with each channel and corresponding printer equipments 34, 54, 74 and 94 for each line circuit.

From the foregoing description and the detail in which the various switching devices have been shown in the drawings, it will be obvious that notwithstanding the fact that certain message or channel routings have been described, numerous variations from such order of channel routings may be readily employed without departing from the spirit of this invention. In this regard it will be clear that the plugs 27, 47, 67 and 87 which correspond with the incoming channels of one line circuit, may be interconnected to any equipment unit similar to the equipments 29, 49, 69 and 89, while the plugs 26, 46, 66 and 86 of these equipments may be interchangeably joined with any of the jacks 25, 45, 65 and 85 which correspond with the several outgoing channels of another line circuit. At the repeater station, the switching arrangement also renders it possible for a transmitter, as the transmitters 111 and 114, to be connected with any one of the jacks 25, 45, 65 and 85 for the purpose of sending to a distant station in substitution of sending operations from another remote station.

What is claimed is:

1. In a telegraphic repeater system, a plurality of lines, duplex equipment for each of said lines, distributer equipment for each line, receiving, transmitting and local sections for the distributer equipment of each line, equipment units for the reception, storing and retransmission of telegraphic impulses, a plurality of sectors for the distributer equipment of each line, switching means for interchangeably connecting said equipment units with the different sectors of the receiving section of the distributer of each line respectively, and further switching means for interchangeably connecting said equipment units respectively with the sectors of the sending section of the distributer equipment common to another one of said lines.

2. In a telegraph repeater system, a plurality of lines, duplex and multiplex equipments for said lines arranged to provide a plurality of incoming and outgoing channels for each line, equipment units for the reception, storing and retransmission of telegraphic impulses, a first and a second switching means for interchangeably connecting said equipment units to respectively join an incoming channel of one line with the outgoing channel of another line, impulse transmitting means, switching means for substituting said impulse transmitting means for an incoming channel of a line, selecting equipment units for recomposing impulses into a message record, branch circuits controlled by said first mentioned equipment units, switching means for joining said branch circuits to control respective ones of said selecting equipment units, and switching means to render impulses from said transmitter effective to control a respective one of said selecting equipment units of another line.

3. In a system for repeating telegraphic impulses, a plurality of lines, duplex and multiplex equipment to provide a plurality of channels in each direction over each of the lines, receiving, sending and local distributer sections for the multiplex equipment of each one of said lines, equipment units comprising devices for the reception, storing and repeating of telegraphic impulses, switching means for each incoming channel of each of said lines for interchangeably connecting these channels with said equipment units, switching means for each outgoing channel of each of the lines for interchangeably connecting these channels with said equipment units, switching means for interchangeably connecting said equipment units with said local sections, and means controlled by the local section of said multiplex equipment on each line to respectively disable said equipment units.

4. In a system for repeating telegraphic impulses, a plurality of lines, duplex equipment for providing a plurality of channels on each of said lines, distributer equipment for increasing the channel capacity of each of said lines, pluralities of equipment groups for the reception, storing and retransmission of signals, switching means for interchangeably joining said equipment groups as links intermediate the channels of different ones of said lines, derived circuits controlled by said equipment groups, a plurality of selective equipment groups for controlling the translation of impulses into a message, switching means for connecting said derived circuits to respectively control said selecting groups, and means controlled by the distributer equipment for momentarily disabling the selecting equipment groups respectively.

5. In a telegraph repeater system, a plurality of lines, duplex equipments for providing a plurality of channels for each of said lines, distributer equipments for increasing the channel capacity of each of said lines, means for the transmission of impulses, means for the reception of impulses, pluralities of electro-responsive repeating groups, switching means for interchangeably inserting said repeating groups to join a channel of one line circuit with a channel of another line, switching means for interchangeably joining said impulse receiving means with the various channels of said lines, switching means for substituting said transmitting means for a channel of one of said lines, and further switching means for joining one of said impulse receiving means with a channel for which a transmitter may have been substituted.

6. In a system for repeating telegraphic impulses, a plurality of lines, duplex equipment for each of said lines, distributer equipment for each of said lines, receiving, sending, local and polarity reversing sections for the distributer equipments, a plurality of sectors for said distributer equipment of each line each sector corresponding with a receiving and a sending channel on the associated line, pluralities of electro-responsive impulse repeating groups, switching means for each receiving channel for respectively joining these channels interchangeably with the impulse repeating groups, switching means for each sending channel for interchangeably receiving connection from respective repeating groups connected with said receiving channels, pluralities of selecting units for recomposing impulses into a message record, and means controlled by said repeating groups to render said selective units effective to reproduce a message under transmission between said sending and receiving channels, respectively.

7. In a system for repeating telegraphic impulses, a plurality of lines, duplex equipment to provide a plurality of channels for each of said lines, distributer equipment to increase the channel capacity of each one of said lines, equipment units for the reception, storing and retransmission of impulses, switching means for interchangeably connecting said equipment units to respectively join the channels of different ones of said lines, a current polarity controlling section for said distributer equipments, switching means for substituting said polarity control distributer section for certain of the channels of a line circuit, and further switching means for varying the frequency of changes in polarity which may be set up by said polarity control section of the distributers.

8. In a repeater system for printing telegraphs, a plurality of lines, means for providing a plurality of channels for each of said lines, a plurality of units comprising impulse repeating means, switching means for interchangeably connecting said units to respectively link the channels of said lines, a plurality of printing units, means for joining said printing units to respectively reproduce messages routed over said channels, transmitting means, switching means for substituting said transmitting means for a channel of one line, line relays for each of said lines, and switching means for conditioning said line relays to respond to said transmitter in rendering impulses therefrom effective with the printing unit associated with the corresponding channel of another line.

9. In a repeater system for printing telegraphs, a plurality of lines, duplex equipment including a line relay for each of said lines, distributer equipment comprising a plurality of sectors for each of said lines, sending, receiving and local sections for said distributer equipment to render each sector thereof effective as a receiving and a sending channel with respect to the associated line, a plurality of repeating units, switching means for interchangeably connecting said repeating units to respectively link a sending channel of one of said lines with the receiving channel of another one of said lines, branch circuits controlled by said repeating units, printer units, switching means for interchangeably connecting said printer units respectively with said branch circuits, means controlled by one of said local sections for momentarily disabling said repeating units respectively, and means controlled by another of said local sections for momentarily disabling said printer units, respectively.

In witness whereof, I hereunto subscribe my name this 10th day of April A. D., 1918.

JOHN H. BELL.